United States Patent [19]
Ishikawa

[11] Patent Number: 4,574,769
[45] Date of Patent: Mar. 11, 1986

[54] MULTI-WIRE VIBRATORY CUTTING METHOD AND APPARATUS

[76] Inventor: Ken-ichi Ishikawa, 2-66-2, Nukatani, Kanazawa-shi, Ishikawa-ken, Japan

[21] Appl. No.: 701,944

[22] Filed: Feb. 15, 1985

[30] Foreign Application Priority Data

Feb. 18, 1984 [JP] Japan .................................. 59-29060
Feb. 18, 1984 [JP] Japan .................................. 59-29061

[51] Int. Cl.$^4$ ............................................. B28D 1/08
[52] U.S. Cl. ...................................... 125/16 R; 125/21
[58] Field of Search .......................... 125/16 R, 12, 21

[56] References Cited

U.S. PATENT DOCUMENTS

| | | | |
|---|---|---|---|
| 3,525,324 | 8/1970 | Bonnefoy | 125/16 R |
| 3,942,508 | 3/1976 | Shimizu | 125/16 R |
| 3,957,028 | 5/1976 | Legiourd | 125/16 R |
| 4,105,012 | 8/1978 | Hini | 125/16 R |

Primary Examiner—Harold D. Whitehead
Attorney, Agent, or Firm—McGlew and Tuttle

[57] ABSTRACT

In a multi-wire type cutting method comprising the steps of stretching and winding a continuous fine wire many times around four multi-grooved blocks disposed at the vertexes of a rectangle, bringing the lower horizontal parallel stretching lines of the wire into a pressed contact with an object which is to be processed and made of a hard and brittle material, reciprocating the contacting parts of the wire lines while applying an abrasive grain suspension to the contact parts and thus carrying out a cutting process on the object, an unused portion of the wire is gradually fed to the contact parts while a used portion of the wire is gradually moved away from this contact part during the periodical reciprocating motion of the wire lines; low frequency vibration is applied in the cutting direction either to the wire lines or to the object at the contact parts; and the amplitude of the vibration is arranged to be greater than the degree of deflection of the wire lines which takes place when the wire lines are pressed into contact with the object.

10 Claims, 7 Drawing Figures

MULTI-WIRE VIBRATORY CUTTING METHOD AND APPARATUS

BACKGROUND OF THE INVENTION

1. Field of the Invention

This invention relates to a vibratory multi-wire type method for cutting a hard and brittle material with fine lines of wire applying slurry and to an apparatus for carrying out the method.

2. Description of the Prior Art

A method has been known for carrying out a cutting process, such as multi-line grooving, cutting off, etc., on a hard and brittle material such as a semi-conductor, a glass material and a ceramic material by means of fine wires. An apparatus employed in carrying out this method has been also known by the name of a multi-wire saw. The multi-wire saw is generally arranged to have many lines of a continuous fine wire stretched and wound or lapped many times around a plurality of multi-grooved blocks; to bring the lower horizontal parallel parts of the stretched lines of the wire into pressed contact with an object to be processed; to allow these fine wire lines to travel while applying an abrasive grain suspension to the contact parts between the wire and the object; and thus to carry out a cutting process such as multi-wire grooving, cutting off, etc. Since the multi-wire saw uses fine wire lines which permit having a smaller allowance for cutting, it gives an improved yield and excels beyond other mechanical cutting methods in that it causes the generation of an affected layer in a much lesser degree that in other methods. According to the arrangement of the multi-wire saw, tightly stretched fine wires are caused to travel while in a state of being pressed against the object to be processed while a suspension containing a granular abrasive is being applied to the part which is in pressed contact to cut the object by lapping between the wire and the object. This arrangement tends to cause a breaking of the fine wire. Wire breakage during a cutting process not only lowers the precision of the cutting work but also greatly lowers the productivity of the cutting work as it requires much time and labor for rearrangement of the wire lines. To solve this problem, a method has been proposed in which the wire lines are allowed to travel at a relatively low speed to prompt a granular abrasive to enter into a cutting part by imparting vibration either to the wires or to the object to be processed. However, at present, the details of the interrelation between the travelling speed of the wires and the amplitude and frequency of the vibration for the processing efficiency, wire breakage and the cutting precision still remain unknown. Therefore, the above-stated method of imparting vibration has not reached a practicable stage as yet, thus leaving some points in need of further improvement.

In an attempt to improve the productivity and cutting precision of the above-stated multi-wire saw and to prevent the wire breakage, the present applicant has conducted research and experiments in varied manners. The findings obtained through these experiments are as follows: The cutting work efficiency (cutting amount per unit time) generally increases with an increase in the force with which the fine wire lines are kept in contact with the object being processed. However, the probability of wire breakage increases when the pressing force is excessive. Therefore, to increase the machining work efficiency while preventing wire breakage, it is necessary to keep the wire tension at about 2 kg and to limit the above-stated pressing force to between 40 and 70 g per wire line in a case where, for example, commercially available wire measuring 0.2 mm in diameter is arranged to travel at about 80 to 120 m/min. In such a case, it has been found that the processing efficiency can be improved by imparting vibration in a specific direction to the wire stretched and wound many times around the multi-grooved blocks.

Further studies on the impartment of vibration has revealed that great improvement can be attained in the process efficiency when the wire and the cutting faces of the object arranged to partially or totally come into contact and move away from each other in a repetitive manner while an abrasive grain suspension (slurry) is being applied to the contacting faces of the wire and the object.

The five wire lines stretched and wound around the multi-grooved blocks must be kept travelling at a speed of about 80 to 120 m/min at their parts which are in pressed contact with the object. However, they must be moved away from the cutting parts, as a used wire portion, before they reach an allowable limit of wear set for an easily breakable wire. Therefore, in order to attain a desired machining efficiency without incurring wire breakage, the following technical requirement must be satisfied: For example, new wires must be gradually fed to the cutting parts at a rate of 0 to 4 m/min while moving the used wire portion away from the cutting parts. Meanwhile, with the wire lines kept at a predetermined value of tension, the wire lines must be allowed to travel at their cutting parts at a rate of 80 to 120 m/min.

SUMMARY OF THE INVENTION

It is an object of this invention to provide a multi-wire saw type cutting method and an apparatus for cutting a hard and brittle material, such as G.G.G., wherein the cutting process is carried out on the basis of the above-stated findings, with a much higher productivity and machining efficiency than that of the prior art methods.

It is another object of this invention to provide a method for minimizing the fear of wire breakage as well as an improvement in the machining efficiency.

It is a further object of this invention to provide a multi-wire vibratory cutting apparatus wherein four multi-grooved blocks are provided with eccentric shafts which eccentrically rotate at the same phase; the eccentric multi-grooved blocks are driven directly by a wire travel driving motor; and the cutting parts of fine wire lines are arranged to make a reciprocative motion at a required speed and to have a low frequency vibration imparted thereto at a required amplitude concurrently with the reciprocating motion.

To attain the above-stated object, a subject matter of the method according to this invention is as follows: In a multi-wire type cutting method comprising the steps of stretching and winding many fine wire lines around four multi-grooved blocks disposed at the vertexes of a rectangle, bringing the lower horizontal parallel parts of the stretched wire lines into a pressed contact with an object which is to be processed and is made of a hard and brittle material, reciprocating contacting parts of the wire lines while applying an abrasive grain suspension (slurry) to the contact parts and thus carrying out a cutting process on the object, a new wire portion is gradually fed to the contact parts while a used wire portion is gradually moved away during the periodical reciprocating motion of the wire lines; low frequency vibration is applied in the cutting direction or in a direction at any desired angle to the cutting direction either to the wire lines or to the object at the contact parts; and the amplitude of the vibration applied is arranged to be greater than the degree of deflection of the wire lines which takes place when the wire lines are pressed into contact with the object to be processed.

Another subject matter of the apparatus according to this invention is as follows: In a multi-wire type cutting apparatus arranged to have many fine wire lines of a continuous fine wire stretched and wound around four multi-grooved blocks disposed at the vertexes of a rectangle, to bring the lower horizontal parallel parts of the stretched wire lines into a pressed contact with an object which is to be processed and is made of a hard and brittle material, to cause the wire lines to make a reciprocating motion at their contacting parts while applying an abrasive grain suspension (slurry) to the contact parts during their reciprocating motion and thus to carry out a cutting process on the object, there are provided wire pay-out and take-up means for gradually feeding a new portion of the wire and gradually moving away a used portion of the wire to and from the contact parts; wire travel control means for causing the wire lines to make a periodical reciprocating motion at the contact parts; fixed supporting blocks each of which is arranged to carry a pair of upper and lower multi-grooved blocks through an elastic plate on each of two sides of the object; and vibrators which are arranged to impart low frequency vertical vibration to the pairs of multi-grooved blocks with the amplitude of the vibration arranged to exceed the degree of deflection of the wire lines which takes place when the wire lines are in a pressed contact with the object to be processed.

In an embodiment of this invention, if the total weight of the object to be processed, the object carrying base, etc. is large, the vibrators are preferably arranged to impart the low frequency vibration to the wire lines instead of the object for the purpose of reducing the load on these vibrators. In that instance, the apparatus is preferably arranged in the following manner: Each pair of the multi-grooved blocks carrying the wire lines which are in a pressed contact with the object to be processed is separately provided with a vibrator for imparting the vertical low frequency vibration to the lower horizontal parallel portions of the wire lines. Further, the phases of the vibrations thus applied to the pairs of the multi-grooved blocks which are disposed on both sides of the object may be arranged to deviate from, instead of being synchronized with, each other.

It is a further subject matter of this invention that an eccentric multi-grooved block type multi-wire vibratory cutting apparatus according to the invention is arranged as follows: Four multi-grooved blocks having eccentric shafts are disposed at the vertexes of a rectangle. A continuous fine wire is stretched and wound many times around the multi-grooved blocks. The lower horizontal parallel extending portions of the stretched lines of the wire are pressed into contact with an object which is to be processed and is made of a hard and brittle material. The contacting parts of the wire lines are arranged to make a reciprocating motion while a suspension containing a granular abrasive therein is being applied to the contacting parts during a cutting process thus being performed on the object. A cutting process part of the apparatus is arranged in this manner. The apparatus further comprises a wire pay-out and take-up part which is arranged to gradually feed a new wire portion to the cutting process part and to gradually move a used portion of the wire away from the cutting process part; a wire travel control part which is arranged to control the reciprocating motion of the wire lines at the cutting process part; and a wire tension variation modifying part which is arranged to modify the variations in tension of the portion of the wire stretched between the wire travel control part and the above-stated cutting process part. Assuming that the eccentricity of the eccentric multi-grooved blocks is $\epsilon$ and the degree of deflection which takes place when the wire lines are in a pressed contact with the object is $\delta$, the apparatus is arranged to have a relation of $\epsilon > \delta$.

The above-stated objects and further objects and features of this invention will become apparent from the following detailed description of the preferred embodiments thereof taken in connection with the accompanying drawings.

DETAILED DESCRIPTION OF THE PREFERRED EMBODIMENTS

Figure 1:
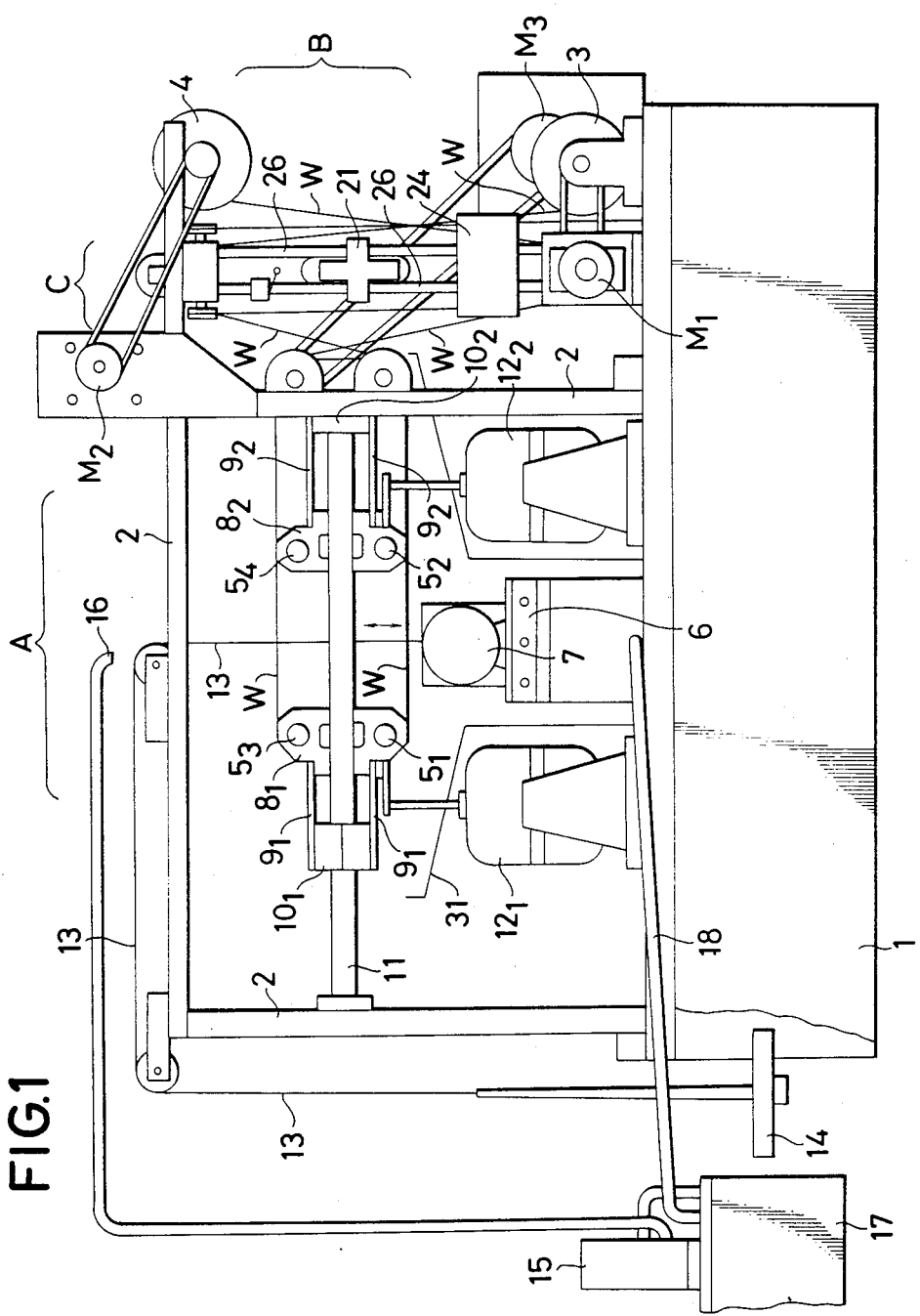
FIG. 1 is a side view schematically showing the whole arrangement of a multi-wire type vibratory cutting apparatus arranged according to the present invention as an embodiment example thereof.

FIG. 1 schematically shows the whole vibratory multi-wire type cutting apparatus arranged according to this invention as an embodiment example thereof. A frame 2 is erected on a base 1. A motor M1 is arranged to drive a new wire bobbin 3 which is arranged to pay out an unused or new portion of the wire W. A motor M2 drives a take-up bobbin 4 which is arranged to take up the used wire portion of the wire. These motors M1 and M2 are mounted on the base 1 and the frame 2. These bobbins and motors jointly form the wire pay-out and take-up means B which is arranged to gradually feed new wire lines W to a contact part between the wire lines and an object to be processed at the cutting process means A which will be described later and to gradually move the used wire lines W away from the collect part. The motor M1 has its rotating speed under control and is capable of causing the new wire bobbin 3 to pay-out the new portion of the wire W to the cutting process means A at a rate between 0 and 4 m/min. The other motor M2 is capable of causing the take-up bobbin 4 to take up the used portion of the wire W from the cutting process means A at a predetermined torque. A cutting operation on the object to be processed is arranged to be completed before the entire amount of the wire wound around the new wire line bobbin 3 is completely consumed.

Figure 2:
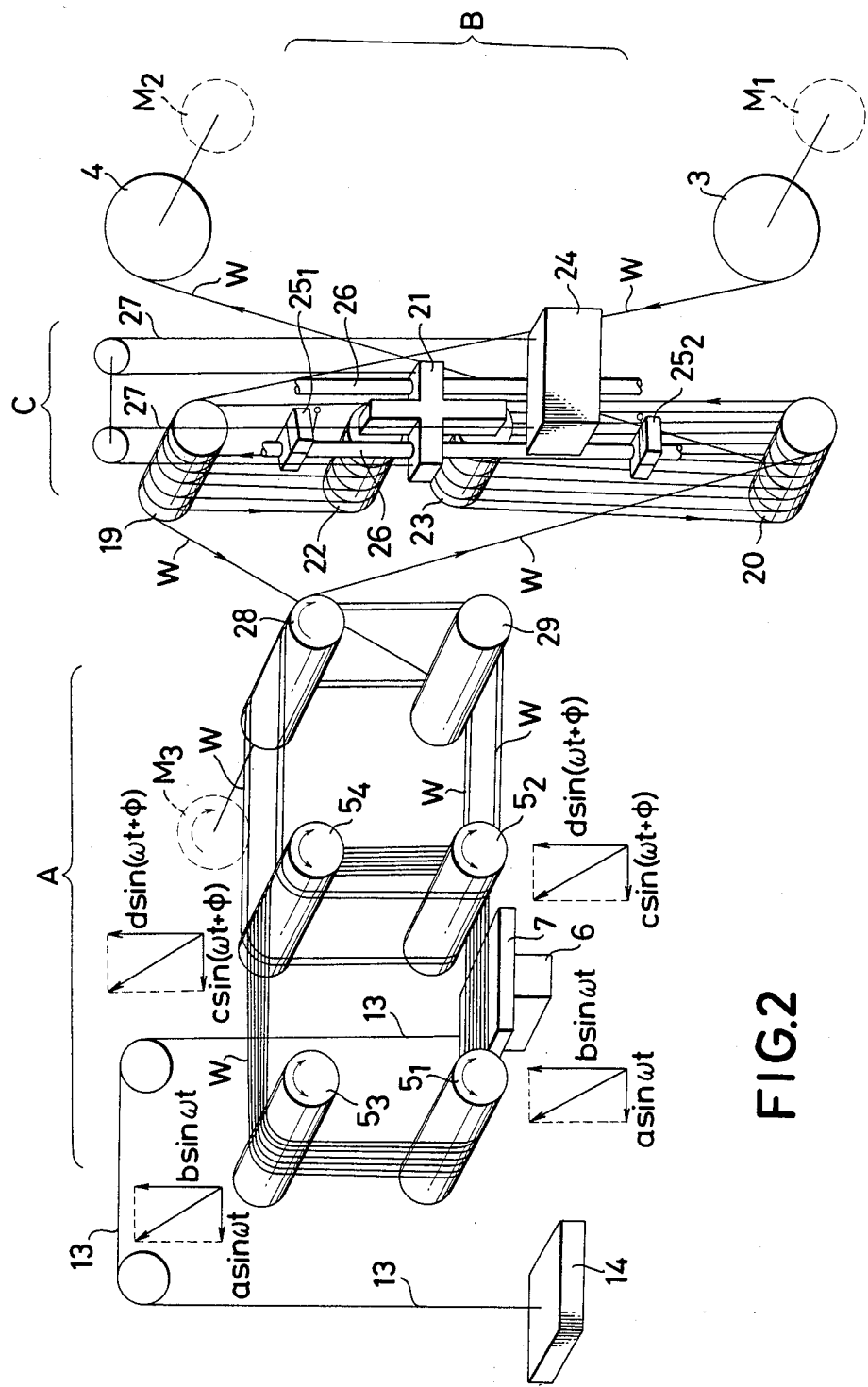
FIG. 2 is an oblique view showing the manner in which the wire lines of the apparatus of FIG. 1 are streched and wound.
Figure 3:
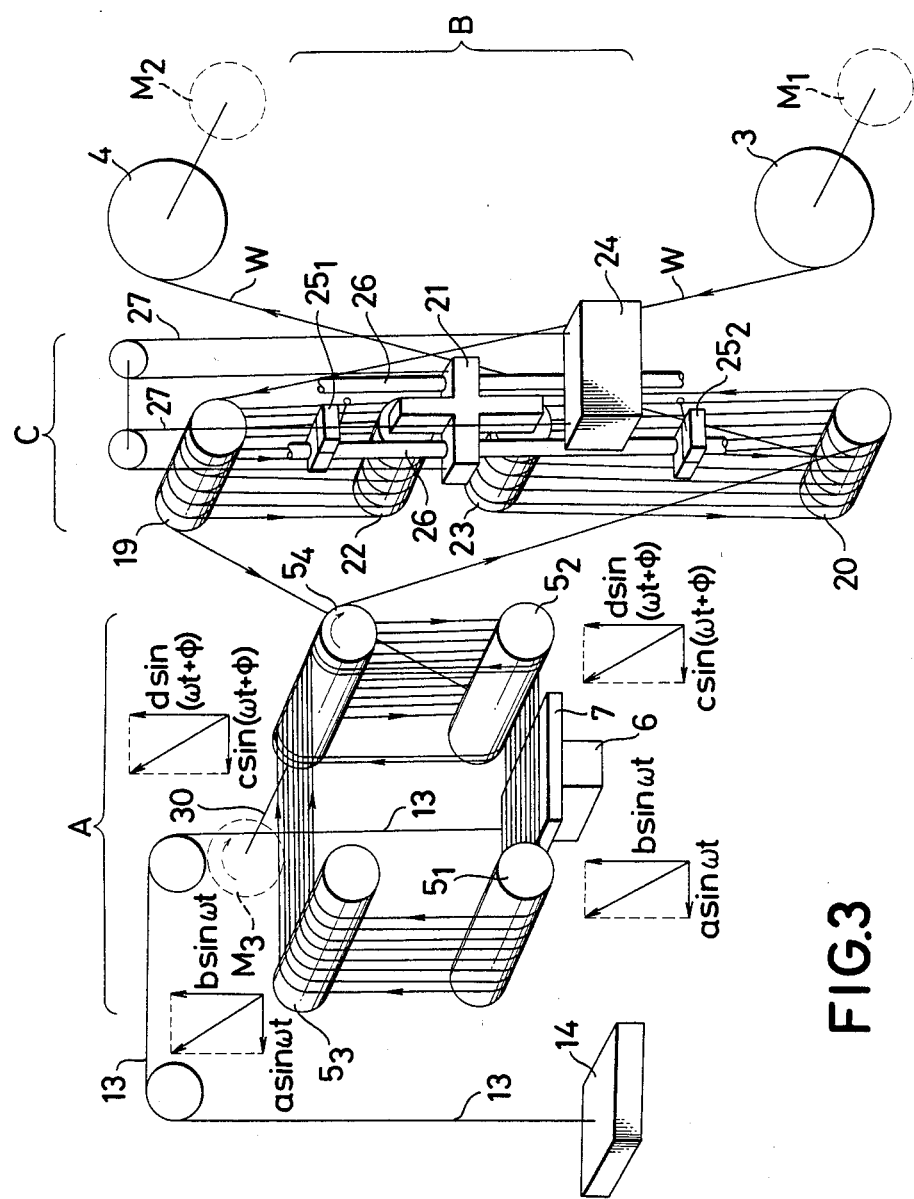
FIG. 3 is an oblique view showing another example of the manner in which the wire lines are wound and stretched many times.

The cutting process means A is arranged in combination with wire travel control means C as shown in FIG. 2 and FIG. 3. Briefly stated, the cutting process means A is arranged as follows: The cutting process means A basically consists of four multi-grooved blocks $5_1$, $5_2$, $5_3$ and $5_4$ which are disposed respectively at the vertexes of a rectangle. A fine wire which is payed out from the new wire bobbin 3 is stretched and wound many times around these multi-grooved blocks and leads to the take-up bobbin 4. The wire thus forms many stretched parallel extending lines. The low horizontal portions of these wire lines form a cutting process part which is arranged to cut an object which is to be processed and is made of a hard and brittle material.

The low horizontal portions of the wire lines are arranged to be opposed to the object 7 which is disposed on a process stand 6 below them. The many wire lines which are wound many times around the four multi-grooved blocks $5_1$-$5_4$ are spaced at a distance which is the same as the distance between the grooves formed in each of the multi-grooved blocks. This spacing of the wire lines defines the thickness of the object to be processed. Referring again to FIG. 1, a pair of upper and lower blocks $5_1$ and $5_3$ which are shown on the left side of the drawing and another pair of upper and lower blocks $5_2$ and $5_4$ which are shown on the right side of the drawing are carried by side plates $8_1$ and $8_2$ respectively in pairs. The side plates of these pairs are in turn resiliently carried by supporting blocks $10_1$ and $10_2$ via leaf springs $9_1$ and $9_2$, so that they are somewhat vertically movable.

One of the supporting blocks, block $10_2$ is secured to the frame 2 while the other block $10_1$ is arranged to be movable and adjustable along and in the axial direction of a guide shaft 11 which is horizontally arranged within the frame 2. This arrangement permits adjustment of the stretching length of the wire lines at the cutting process part according to the size of the object.

Vibrators $12_1$ and $12_2$ are arranged to vibrate the two pairs of multi-grooved blocks $5_1$, $5_3$, $5_2$ and $5_4$ respectively. They impart vertical vibrations of, for example, several tens to hundreds and several tens of Hz to the left and right pairs of side plates $8_1$ and $8_2$ with the upper ends of their vibrating shafts rigidly connected to these side plates.

The processing stand 6 is provided with a device which is arranged to slowly lift the object 7 upward accordingly as the cutting process progresses. In this specific embodiment example, this device has a weight 14 connected to the processing stand 6 by means of a cable 13 via a pulley; and is arranged to pull the processing stand 6 upward to bring the wire line W into contact with the object 7 at a predetermined pushing force by suitably adjusting the weight of the weight 14. This pushing force is arranged to be, for example, ≅40 to 70 g per wire line.

An abrasive grain suspension supply device 15 is arranged to continuously supply a solution which has a granular abrasive suspended therein (hereinafter referred to as the processing liquid) via a nozzle 16 to the cutting faces of the object during the cutting process. A recovering tank 17 is arranged to recover the processing liquid via a recovering pipe 18 and a recovering frame 31.

The details of the wire travel control means C which is arranged to cause the wire lines to periodically make a reciprocating motion across the object at the contacting part are as follows: Referring to FIGS. 2 and 3, the wire travel control means C comprises a first standing block group 19 and a second standing block group 20 which are vertically spaced at a distance; a slider 21 which is arranged to freely make a reciprocating motion between the standing block groups 19 and 20; a first running block group 22 and a second running block group 23 which are attached to the slider 21; a balancing weight 24 which is arranged to keep the weight of the slider 21 and those of the first and second running block groups which are attached to the slider balanced therewith; and a pair of limit switches $25_1$ and $25_2$ which are arranged at the ends of the reciprocating stroke of the slider 21 to effect a switch-over between the normal and reverse rotations of a wire travel driving motor M3 by engaging the slider 21.

Figure 4:
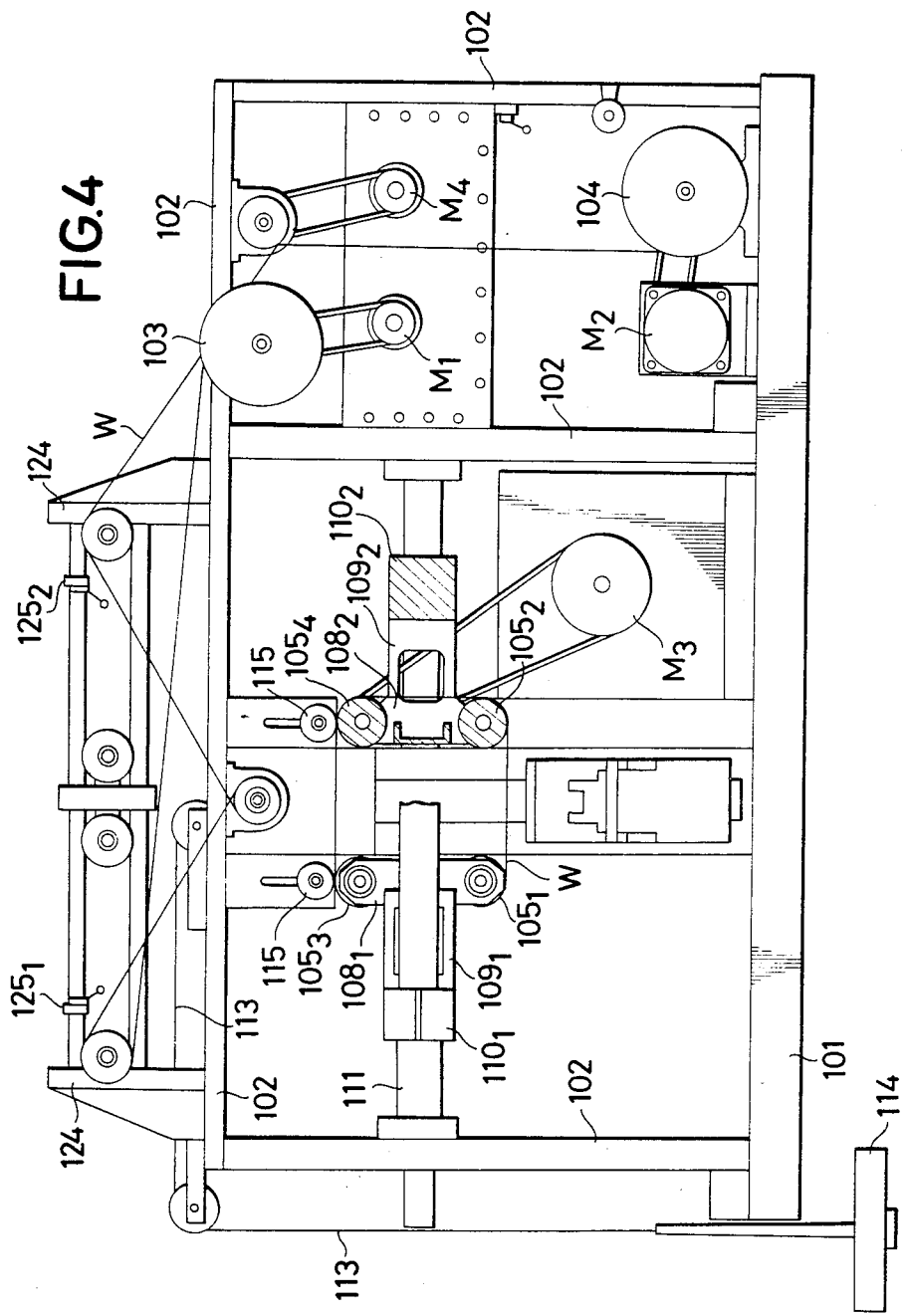
FIG. 4 is a side view schematically showing an eccentric multi-grooved block type multi-wire vibratory cutting apparatus arranged according to this invention as another embodiment example thereof.

Although the wire travel control means C is shown in a vertical arrangement, it may be in a horizontal arrangement as shown in FIG. 4. In this case, the balancing weight may be omitted. The wire travel control means or device C operates as follows: The total length $l_1+l_2$ of the stretched length $l_1$ of the wire lines wound many times between the upper first running block group 22 and the upper first standing block group 19 and the stretched length $l_2$ of the wire lines wound many times between the lower second running block group 23 and the lower second standing block group 20 is kept unvarying. However, the length $l_1$ decreases and the length $l_2$ increases when the slider 21 moves upward. Conversely, the length $l_1$ increases and the length $l_2$ decreases when the slider moves downward. This arrangement of the wire travel control means C enables the cutting process means A to have the wire lines W periodically reciprocate at a predetermined speed at the cutting process part while keeping the total length of the fine wire W from the new wire bobbin 3 to the take-up bobbin 4 unvaried. Further, since the weights of the moving parts included in the wire travel control means C, i.e. the weights of the slider 21 and the first and second running block groups 22 and 23 are balanced with the balancing weight 24 which is connected by the cable 27 via the pulley, the load on the wire travel driving motor M3 is reduced to permit a smooth switch-over of the rotating direction thereof for the reciprocating motion of the wire lines W.

For switch-over between the normal and reverse rotations of the wire travel driving motor M3, the pair of limit switches $25_1$ and $25_2$ are disposed in the upper and lower predetermined positions as mentioned above. The slider 21 abuts onto the upper limit switch $25_1$ when it moves upward and onto the lower limit switch $25_2$ when it moves downward thus electrically changing the rotating direction of the motor M3. With the rotating direction of the motor M3 changed in this manner, the changes thus effected cause the wire lines through a driving block 28 to make the reciprocating motion.

Further, each of the first and second standing block groups 19 and 20 and the first and second running block groups 22 and 23 consists of many blocks. Each block has one wire line W lapped thereon. Many running blocks are thus coaxially arranged to form one group 22 or 23 and to be independently rotatable.

The procedure for stretching and winding around the wire and the driving operation on the wire lines for their reciprocating motions in the multi-wire saw apparatus which comprises the cutting process means A, the wire pay-out and take-up means B and the wire travel control means C are further described in the light of the whole apparatus as follows: Referring to FIG. 2, the wire W is payed out from the new wire bobbin 3. The wire first comes to the first standing block group 19 which is disposed in the upper part of the wire travel control means C. The wire is wound and strectched many times between the standing block group 19 and the first running block group 22. The wire is then led from the last of the block members of the standing block group 19 to the block 29 which is one of a pair of intermediate standing blocks 28 and 29 and is located on the lower side. Following this, the wire W is stretched and wound several times between the intermediate block pair 28 and 29 and the right-hand side multi-grooved blocks $5_2$ and $5_4$ which are included in the cutting process means A.

In the specific embodiment shown in FIGS. 1 and 2, the intermediate standing block 28 which is located on the upper side is arranged to be a running block and to be rotatable in the normal and reverse directions by the wire travel driving motor M3.

After winding the wire W around the above-stated blocks, the wire is further stretched and wound around the four multi-grooved blocks $5_1$, $5_2$, $5_3$ and $5_4$ which form the cutting process means A a desired number of turns with predetermined spacing.

Then, the wire W is again wound around several times between the multi-grooved blocks $5_2$ and $5_4$ disposed on the right side and the intermediate standing blocks 28 and 29. After that, the wire is led to the second standing block group 20 which is located below the wire travel control device C to be wound around several times between the second standing block group 20 and the second running block group 23 which is disposed on the slider 21. The number of turns of the winding around between the second standing and running block groups 20 and 23 is equal to that of winding between the above-stated first standing block group 19 and the first running block group 22. The wire W is then led from the last block of the second standing block group 20 to the take-up bobbin 4. The stretching and winding operation on the wire W comes to an end with the leading end of the wire wound on the take-up bobbin 4. Further, after completion of the stretching and winding around work on the wire W, it is generally necessary to carry out a running-in operation over a given period of time for obtaining a predetermined constant value of wire tension at the cutting process part prior to the start-up of the cutting operation.

In another embodiment example of the present invention which is arranged as shown in FIG. 3, the intermediate standing blocks 28 and 29 which are shown in FIG. 2 are omitted. In this case, the wire W which comes out from the first standing block group 19 of the wire travel control means C is led directly to the multi-grooved block $5_2$ of the cutting process means A. After that, another multi-grooved block $5_4$ of the means A, the wire W is led directly to the second standing block group 20 of the wire travel control means C. The multi-grooved block $5_4$ is arranged to be rotated via a flexible shaft 30 by the wire travel driving motor M3. With the intermediate standing blocks 28 and 29 of the preceding example omitted, the apparatus shown in FIG. 3 becomes more compact than the one shown in FIG. 2. However, there is no substantial difference between them in the cutting function.

In each of the apparatuses shown in FIGS. 2 and 3, when the intermediate standing block 28 or the multi-grooved block $5_4$ is driven to turn clockwise in the direction of the arrow by the wire travel driving motor M3, all the multi-grooved blocks $5_1$, $5_2$ and $5_3$ are caused to turn clockwise by the leftward travelling motion of the wire W. Accordingly, at the wire travel control means C, the first and second standing block groups 19 and 20 and the first and second running block groups 22 and 23 are caused to turn and the slider 21 ascends. In other words, while the wire W travels in the leftward direction at the cutting process part, the length of the wire portion wound around between the first standing and running block groups 19 and 22 of the wire travel control means C is shifted to the length of the wire portion wound around between the second standing and running block groups 20 and 23. Following that, when the slider 21 comes to abut onto the upper limit switch $25_1$, the wire travel driving motor M3 begins to rotate in the reverse direction to cause all of the multi-grooved blocks $5_1$, $5_2$, $5_3$ and $5_4$ to turn counterclockwise. In this instance, the wire W travels in the rightward direction at the cutting process part. Then, the slider 21 descends until it comes to abut onto the lower limit switch $25_2$ to again switch over the rotating direction of the wire travel driving motor M3.

The lower horizontal parallel stretching wire lines of the cutting process means A are thus caused to make their reciprocating motion. During this motion, the periodical vertical movement of the slider 21 merely interchanges the wire portion wound around between the first standing and running groups 19 and 22 with the portion wound around between the second standing and running groups 20 and 23. The reciprocating motion is thus performed irrelatively to the operation of one wire pay-out and take-up means B which feeds a new portion of wire from the new wire bobbin 3 and takes up a used portion of wire onto the take-up bobbin 4. The many parallel stretched wire lines which are thus arranged to be in contact with the upper surface of the object to be processed at the cutting parts thereof are thus gradually replaced with new wire lines before they reach their wear limit. Therefore, they can be effectively prevented from being broken due to excessive wear.

A feature of the multi-wire saw apparatus arranged according to the invention as described above is as follows: Two units of the vibrators $12_1$ and $12_2$ are arranged to cause the left side pair of multi-grooved blocks $5_1$ and $5_3$ and the right side pair of multi-grooved blocks $5_2$ and $5_4$ which are disposed at the cutting process part to vertically vibrate at a low frequency in the cutting direction is indicated by the arrows in FIG. 1. As a condition for the vibration, the vibration is arranged to have an amplitude larger than the degree of deflection $\Delta$ which takes place in the wire W when the object 7 is pushed by the lifting device of the process stand 6 into contact with the wire W.

The degree of deflection $\Delta$ is determined by the tension of the wire portion W stretching between the left and right pairs of the multi-grooved blocks, the length of the stretching span, the length of contact between the object and the wire, the magnitude of the pushing force of the object against the wire, etc. With an allowable tensile load on the wire W and the durability of the multi-grooved blocks duly taken into consideration with some safety allowance, it is advantageous in machining efficiency to increase the pushing force. Meanwhile, it is advantageous for processing precision to decrease the degree of the wire deflection.

On the other hand, the effect of the vibration imparted to the multi-grooved block pair $5_1$ and $5_3$ and another pair $5_2$ and $5_4$ with the wire deflecting degree A kept unvarying can be considered as follows: Since the wire W can be regarded as repeating its vertical motion thus virtually retaining its straight line state between the left and right pairs of multi-grooved blocks, the wire W repeatedly moves away from the cutting face of the object with the amplitude of the vibration exceeding the degree of deflection Δ. This enables the granular abrasive of the processing liquid to readily come into a separating space thus intermittently given between the wire W and the cutting face of the object. Therefore, compared with a process imparting no vibration or vibration of small amplitude, the process efficiency is enhanced to a great degree.

Regarding the direction of the vibration, it may be applied in any desired direction in the vertical plane, instead of the vertical direction (cutting direction). In this case, the cut surface which is otherwise likely to convex due to the horizontal vibration component can be made uniformly flat. Further, the vibration can be applied to either or both of the work piece and the wire line through the multi-grooved blocks.

When the vibration is given to the multi-grooved blocks, the direction of the resultant composite vibrations are shown in FIGS. 2 and 3, in which a, b, c and d respectively represent the displacement amplitude, ω represents the circular frequency, φ represents the phase difference in the vibration of the blocks $5_2$ and $5_4$ on the right side with respect to the blocks $5_1$ and $5_3$ on the left side. When the vibration is given to the work piece only the phase difference is zero, and the vibration can be made by a simple mechanism as a piston crank mechanism using an inclined guide.

FIG. 4 schematically shows in a side view the whole arrangement of an eccentric multi-grooved block type multi-wire vibratory cutting apparatus arranged according to this invention as another embodiment example thereof. The apparatus is provided with a base 101 having a frame 102 erected thereon. On the base 101 and the frame 102 are mounted a new wire bobbin 103 which is arranged to be driven by a motor M1 to pay out a new or unused portion of wire W and a take-up bobbin 104 which is arranged to be driven by another motor M2 to take up a used portion of wire W. They form a wire pay-out and take-up part B which serves to gradually feed a contact part between the wire portion located at a cutting process part A and an object to be processed with the new wire portion and to move the used portion of the wire W from the contact part.

The above-stated motor M1 operates under a speed control and is capable of having the new portion of wire W payed out from the new wire bobbin 103, for example, at a rate of 0 to 4 m per minute. The other motor M2 operates to have the used portion of wire W which comes from the cutting process part A wound up onto the take-up bobbin 104. A cutting process on the object is arranged to come to an end before the entire amount of wire W wound on the new wire bobbin 103 has nearly been used up.

Figure 5:
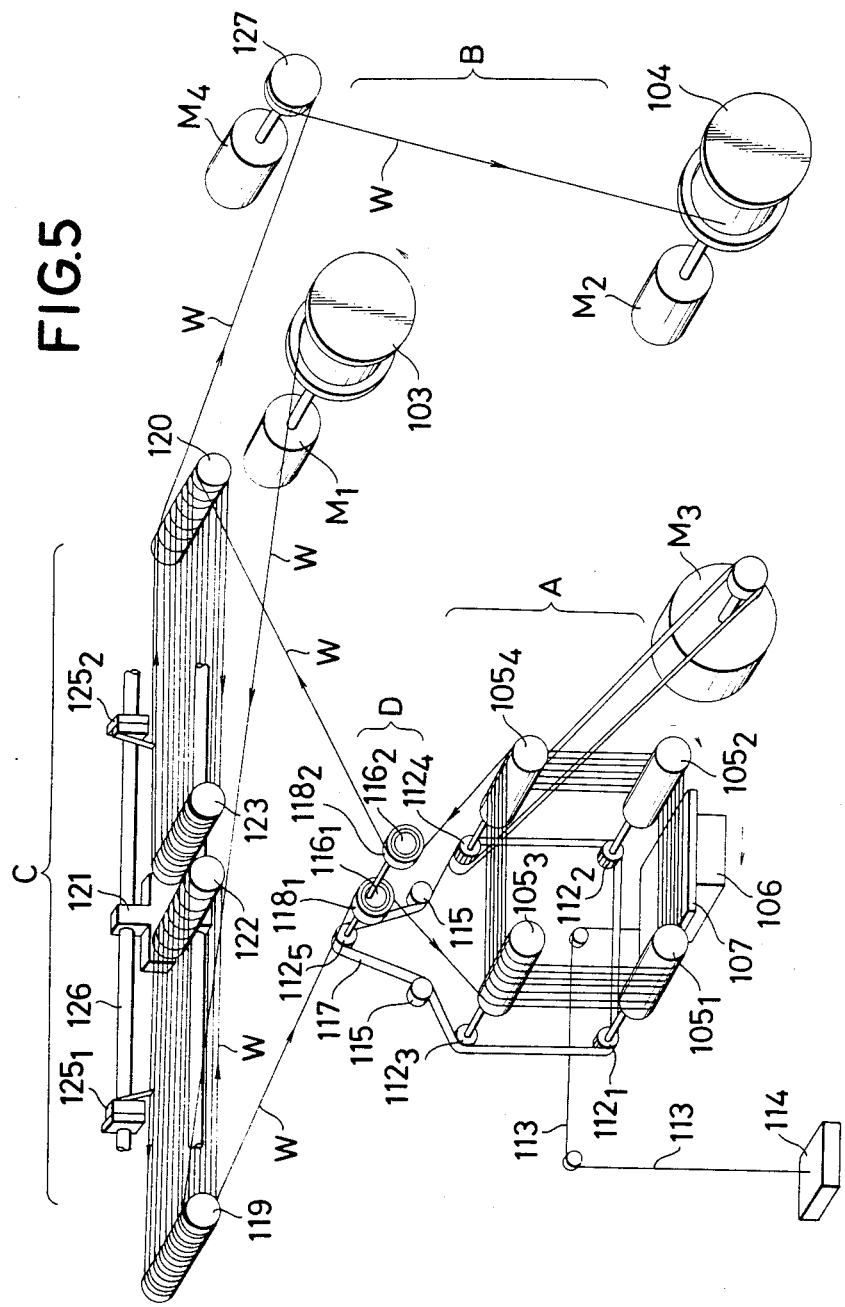
FIG. 5 is an oblique view showing, the manner in which the wire lines of the apparatus of FIG. 4 are stretched and wound many times.

The details of the above-stated cutting process part A are arranged as shown in FIG. 5 together with those of the wire travel control part C. However, briefly stated, the cutting process part A is arranged as follows: The part A is basically composed of four multi-grooved blocks $105_1$, $105_2$, $105_3$ and $105_4$ which are arranged respectively at the vertexes of a rectangle. These blocks have the same phase, the same degree of eccentricity and eccentric shafts of the same size. A continuous fine wire W which comes from the new wire bobbin 103 is lapped or wound and stretched repeatedly many times around these eccentric multi-grooved blocks $105_1$–$105_4$. The lower horizontal portions of parallel stretched wire lines form a cutting process part A to be used for cutting an object 107 which is to be processed.

The lower horizontal portion of the above-stated wire are opposed to the object 107 which is on a process stand 106. The many wire lines which are stretched and wound or lapped many times around the eccentric multi-grooved blocks $105_1$, $105_2$, $105_3$ and $105_4$ parallel to one another are spaced equally in the interval distance of the grooves of each of the multi-grooved blocks. The thickness of the product to be obtained by cutting the object is determined by the spacing of the wire lines.

The upper and lower eccentric multi-grooved blocks $105_1$ and $105_3$ are paired on the left side while the upper and lower eccentric multi-grooved blocks $105_2$ and $105_4$ are paired on the right side as viewed from the drawing. The left pair $105_1$ and $105_3$ are carried by side plates $108_1$ and the right pair $105_2$ and $105_4$ by side plates $108_2$ respectively. These side plates $108_1$ and $108_2$ are rigidly carried by support blocks $110_1$ and $110_2$ via brackets $109_1$ and $109_2$.

The support block $110_2$ which is disposed at the cutting process part A is secured to the frame 102. However, the other support block $110_1$ is arranged to be movable for adjustment along and in the axial direction of a horizontal guide shaft 111 which is disposed within the frame 102. This arrangement makes the length of the stretched wire lines of the cutting process part adjustable according to the size of the object.

Referring to FIG. 5, the eccentric multi-grooved blocks $105_1$–$105_4$ are respectively provided with timing gears $112_1$, $112_2$, $112_3$ and $112_4$. An endless timing belt 117 is arranged around these timing gears and another timing gear $112_5$, which is an idler is provided for tightening the belt 117.

Among these timing gears, the gear $112_4$ is arranged to be driven by a wire travel driving motor M3 to make either a normal or reverse rotation through a belt. Such being the arrangement, the four eccentric multi-grooved blocks $105_1$–$105_4$ are arranged to be caused to simultaneously turn in the normal or reverse direction by the driving operation of the wire travel driving motor M3, the rotation of which is periodically switched over from one direction to the other. Then, the lines of the wire W, which is lapped around these blocks, make reciprocating motions at the cutting process part. Since these multi-grooved blocks $105_1$–$105_4$ have the same phase, the same degree of eccentricity and the same size, they cause the wire lines of the cutting process part to vibrate up and down at an amplitude equal to the degree of eccentricity as well as in their travelling directions during their periodic reciprocating motions. For example, with the diameter of the eccentric multi-grooved blocks assumed to be 5 cm and the wire lines W to be travelling at a rate of 100 m per minute, a low frequency vibration of about 11 Hz is applied to the wire lines at the cutting process part.

The above-stated process stand 106 is provided with an uplifting device which is arranged to push the object 107 slowly upward accordingly as the cutting process on the object progresses. In this specific embodiment of the invention, this device is arranged as follows: A weight 114 is connected via a pulley by a cable 113 to the process stand 106. The weight of this weight 114 is suitably adjusted to lift the process stand 106 in such a way as to have the wire lines W in contact with the object 107 under a predetermined pushing force which is, for example, $\cong 40$ to 70 g per wire line. Further, a solution having a granular abrasive suspended therein (called a process liquid) is arranged to be continuously supplied to the cutting faces of the object during the cutting process from a supply arrangement, which is not shown.

The details of the wire travel control part C which is arranged to cause the wire lines W contacting the object to make a periodic reciprocating motion are as follows: The travel control part C comprises, as shown in FIG. 5, a first standing block group 119 and a second standing block group 120 which are spaced on the left and right sides in the upper part of the frame 102; a slider 121 which is arranged to make a reciprocating motion to the left and right between the standing block groups 119 and 120; a first running block group 122 and a second running group 123 which is attached to the slider 121; and a pair of limit switches $125_1$ and $125_2$ which are arranged to effect a switch-over between the normal and reverse rotations of the above stated wire travel driving motor M3 by engaging the slider 121 at the left and right ends of the reciprocating stroke of the slider 121.

The slider 121 is guided by a guide bar 126 which extends between a pair of left and right brackets 124 in the upper part of the frame 102. The length of the stretching span of the wire lapped around many times between the first running block group 122 mounted on the left side of the slider 121 and the first standing block group 119 which is mounted on the left bracket 124 is assumed to be l1. The length of the stretching span of the wire lapped around many times between the second running block group 123 mounted on the right side of the slider 121 and the second standing block group 120 which is mounted on the right bracket 124 is assumed to be l2. The wire travel control part C is arranged to have the total length of l1+l2 always unvarying while the slider 121 makes the reciprocating motion. The length l1 decreases and the length l2 increases when the slider 121 moves to the left. Conversely, the length l1 increases and the length l2 decreases when the slider moves to the right. By this, the total length of a continuous fine wire W from the new wire bobbin 103 to the take-up bobbin 104 are kept unvarying while the wire lines at the cutting part in the cutting process means A are caused to make periodic reciprocating motions at a predetermined speed.

The pair of limit switches $125_1$ and $125_2$ are arranged on the left and right sides of the slider 126 for the purpose of a switch-over between the normal and reverse rotations of the wire travel control motor M3 as mentioned above. The rotating direction of the motor M3 is electrically shifted from one direction to the other when the slider 121 comes to abut onto the left or right limit switch $125_1$ or $125_2$. Then, the eccentric multi-grooved blocks $105_1$–$105_4$ are periodically turned in the normal or reverse direction by the motor M3. This causes the wire lines to make their reciprocating motions at the cutting process part.

Each of the first and second standing block groups 119 and 120 and the first and second running block groups 122 and 123 consists of many blocks. Each of these member blocks has one of many wire lines lapped thereon and is arranged to be independently rotatable on the shaft thereof.

At the cutting process part A, the eccentric multi-grooved blocks $105_1$–$105_4$ are simultaneously rotated by the wire travel driving motor M3 through the timing gears $112_1$–$112_4$ and a timing belt 117 with an eccentricity of the same phase. Therefore, the wire lines which are in a pressed contact with the object have a low frequency vibration of an amplitude equal to the eccentricity of the eccentric multi-grooved blocks applied to them both in their travelling direction and in their cutting direction. The low frequency vibration based on the rotations of the eccentric multi-grooved blocks results in variations in the tension of the wire line W stretched between the cutting process part A and the wire travel control part C. To solve this problem, the embodiment is provided with a wire tension variation modifying part D.

As shown in FIG. 5, the wire tension variation modifying part D includes a timing gear $112_5$ which is disposed above the upper horizontal portions of the wire lines stretched at the cutting process part A and is arranged to be driven together with the timing gears $112_1$, $112_2$, $112_3$ and $112_4$ by the timing belt 117; first and second eccentric shaft parts $116_1$ and $116_2$ which are arranged on the shaft of the timing gear $112_5$; and first and second free blocks $118_1$ and $118_2$ which are arranged at the eccentric shaft part $116_1$ and $116_2$ to be freely rotatable. Each of the eccentric shaft parts $116_1$ and $116_2$ has the same phase and the same degree of eccentricity as the eccentric multi-grooved blocks of the cutting process part A. Each of the free blocks $118_1$ and $118_2$ is of the same size as the eccentric multi-grooved blocks $105_1$–$105_4$ and is arranged to be eccentrically rotated by the wire travel driving motor M3 at the same phase as and in synchrony with the eccentric multi-grooved blocks.

The procedures for stretching and lapping or winding the wire W and an arrangement to cause the periodic reciprocating motion of the wire of the embodiment which comprises the cutting process part A, the wire pay-out and take-up part B, the wire travel control part C and the wire tension vibration modifying part D are as follows: Referring to FIG. 5, the wire W is payed out from the new wire bobbin 103. The wire first comes to the first standing block group 119 which is disposed on the left side of the wire travel control part C. The wire is lapped around and stretched many times between the standing block group 119 and the first running block group 122 which is disposed on the left side of the slider 121. Then, the wire is led from the last block of the standing block group 119 via the first free block $118_1$ of the wire tension variation modifying part D to the cutting process part A.

At the cutting process part A, the wire is lapped many times around the eccentric multi-grooved blocks $105_1$–$105_4$. Then, the wire is led via the second free block $118_2$ of the wire tension variation modifying part D to the second standing block group 120 which is located on the right side of the wire travel control part C. Within the wire travel control part C, the wire is lapped around between the second standing block group 120 and the second running block group 123 which is disposed on the right side of the slider 121. After the last block of the second standing block group 120, the leading end of the wire W is taken up on the take-up bobbin 104 to complete the wire stretching and winding procedure.

In the specific embodiment described, the wire W, which is led from the last block member of the second standing block group 120, is lapped over a capstan 127 before it is taken up on the take-up bobbin 104. The capstan 127 is arranged to be driven by a torque motor M4 in such a way as to have the tension of the wire kept unvarying by virtue of the motor M4. Generally, however, in order to bring the wire tension to a predetermined constant value at the cutting process part A after completion of the wire stretching and winding work, it is necessary to carry out a running-in operation before commencement of the cutting process.

In the embodiment shown in FIGS. 4 and 5, the wire travel driving motor M3 causes the eccentric multi-grooved blocks $105_1$–$105_4$ to turn clockwise in the direction of the arrow through the timing gears $112_1$–$112_4$ and the timing belt 117. The lower horizontal portions of the wire lines W then simultaneously travel to the left. Concurrently with this, low frequency vibration which corresponds to the number of revolutions of the eccentric multi-grooved blocks $105_1$–$105_4$ and has an amplitude equal to their degree of eccentricity is imparted to the wire lines.

Figure 6:
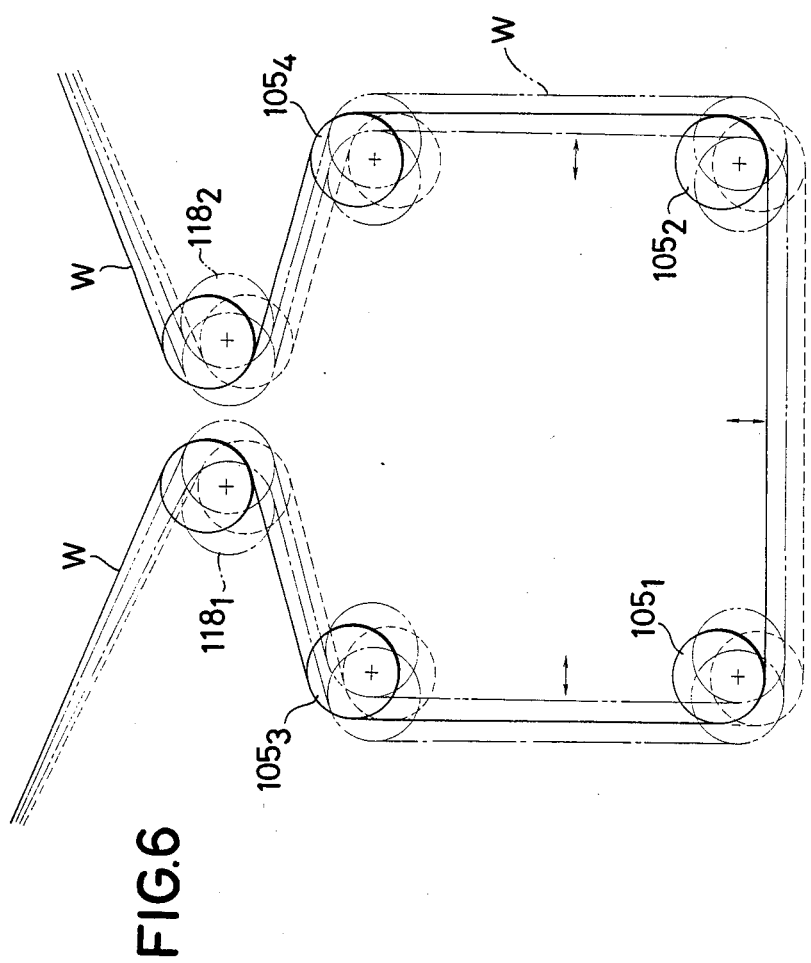
FIG. 6 is an illustration of vibration of wire lines and the wire tension variation modifying operation of the wire tension variation modifying part which is arranged to modify variations of wire tension caused by the wire vibration.

Since the low frequency vibration is caused by the eccentric rotation of the multi-grooved blocks $105_1$–$105_4$, the wire lines W vibrate both in the vertical and horizontal directions as shown in FIG. 6. In this instance, the wire W is lapped over the first and second free blocks $118_1$ and $118_2$ of the wire tension variation modifying part D. Therefore, these free blocks 1181 and 1182 are also eccentrically rotated at the same phase as and in synchrony with the eccentric multi-grooved blocks $105_1$–$105_4$. By virtue of this arrangement, almost no variation takes place in the tension of the wire W, so that a vibratory cutting process can be carried out without impediment.

When the wire lines travel to the left at the cutting process part A as mentioned above, the first and second standing block groups 119 and 120 and the first and second running block groups 122 and 123 follow this and rotate to move the slider 121 to the right. In other words, while the wire W travels to the left at the cutting process part A, the length of a wire portion wound or lapped around between the second standing block group 120 and the second running block group 123 at the wire travel control part C is shifted to the length of a wire portion lapped around between the first standing block group 119 and the first running block group 122.

With the slider thus moved to the right, when it comes to abut onto the right limit switch $125_2$, the rotating direction of the wire travel driving motor M3 is switched over to the reverse direction. Accordingly, all of the multi-grooved blocks $105_1$–$105_4$ come to rotate counterclockwise. In this instance, the travelling direction of the wire lines at the cutting process part A changes to the rightward direction. As a result of that, the slider 121 moves to the left until if comes to abut onto the left limit switch $125_1$. After that abutting contact, again the rotating direction of the wire travel driving motor M3 is shifted.

The lower horizontal wire lines which stretch in parallel at the cutting process part A thus make a periodical reciprocating motion. This reciprocating motion is performed irrelatively to the operation of the wire pay-out and take-up part B which pays out the wire from the new wire bobbin 103 and takes up the used portion of the wire onto the take-up bobbin 104, because: The wire portion which is lapped around between the first standing and running block groups 119 and 122 and another wire portion which is lapped around between the second standing and running block groups 120 and 123 are interchanged with each other according to the reciprocating motion of the parallel wire lines. At the cutting process part, the many wire lines stretched in parallel can thus be reciprocated in contact with the upper surface of the processing object 107, for example, at a speed of 80 to 120 m/min and at a frequency of 1 to 2 sec. In the meantime, the new wire bobbin 103 pays out the wire at a rate of 0 to 4 m/min. The take-up bobbin 104 is then driven by the motor M2 to take up thereon a length of the used portion of the wire corresponding to the payed out length of the new portion of the wire. The wire lines which are reciprocating at the cutting process part are thus gradually replaced with the new portion of the wire.

At the cutting process part, the wire wears away accordingly as the cutting work on the object progresses. However, since the worn portion of wire is moved away from the cutting process part and is replaced with the new portion of wire before it reaches an allowable wear limit thereof, no wire breakage takes place during the cutting process.

The multi-wire vibratory cutting apparatus which is arranged according to this invention as described above is characterized in that: The four multi-grooved blocks which are disposed at the vertexes of a rectangle are arranged to be eccentric blocks of the same phase and of equal degrees of eccentricity. The wire lines which are obtained by lapping the wire around these multi-grooved blocks and are stretched in parallel at the cutting process part are reciprocated at the cutting process part while low frequency vibration is imparted to them. The low frequency vibration which is caused by the synchronized rotation of the eccentric multi-grooved blocks $105_1$–$105_4$ and is imparted to the reciprocating wire lines has an amplitude ε which is equal to the eccentricity of these blocks. The vibration is imparted both in the cutting direction and the travelling direction of the wire lines. The amplitude ε is arranged to be greater than the degree of deflection δ of the wire which takes place when the object 107 is pushed into contact with the wire W.

The deflection degree δ of the wire is determined by the tension of the wire lines stretching between the left and right pairs of eccentric multi-grooved blocks, the stretching length of the wire lines, the length of the contact part between the object and the wire lines, and the magnitude of the pushing force of the object exerted on the wire lines. With a safely allowable tensile load on the wire W and the durability of the multi-grooved blocks duly taken into consideration, the machining efficiency can be increased by arranging the above-stated pushing force to be as large as is allowable under such conditions. On the other hand, it is advantageous for processing precision to have a small degree of wire deflection. The wire lines can be regarded as repeating the vertical and horizontal vibrations based on the in-phase and synchronized eccentric rotations of the eccentric multi-grooved blocks 105₁–105₄ while their linear state is substantially maintained between the left and right pairs of the multi-grooved blocks. Therefore, with the vibration amplitude ε exceeding the deflection degree δ, the wire is intermittently separated from the cutting face of the object to enable the granular abrasives of the processing liquid to readily enter the separating part. As a result of this, the processing efficiency becomes much higher than the efficiency attainable by a process carried out without vibration or with vibration of an amplitude less than the above-stated deflection degree δ of the wire.

Figure 7:
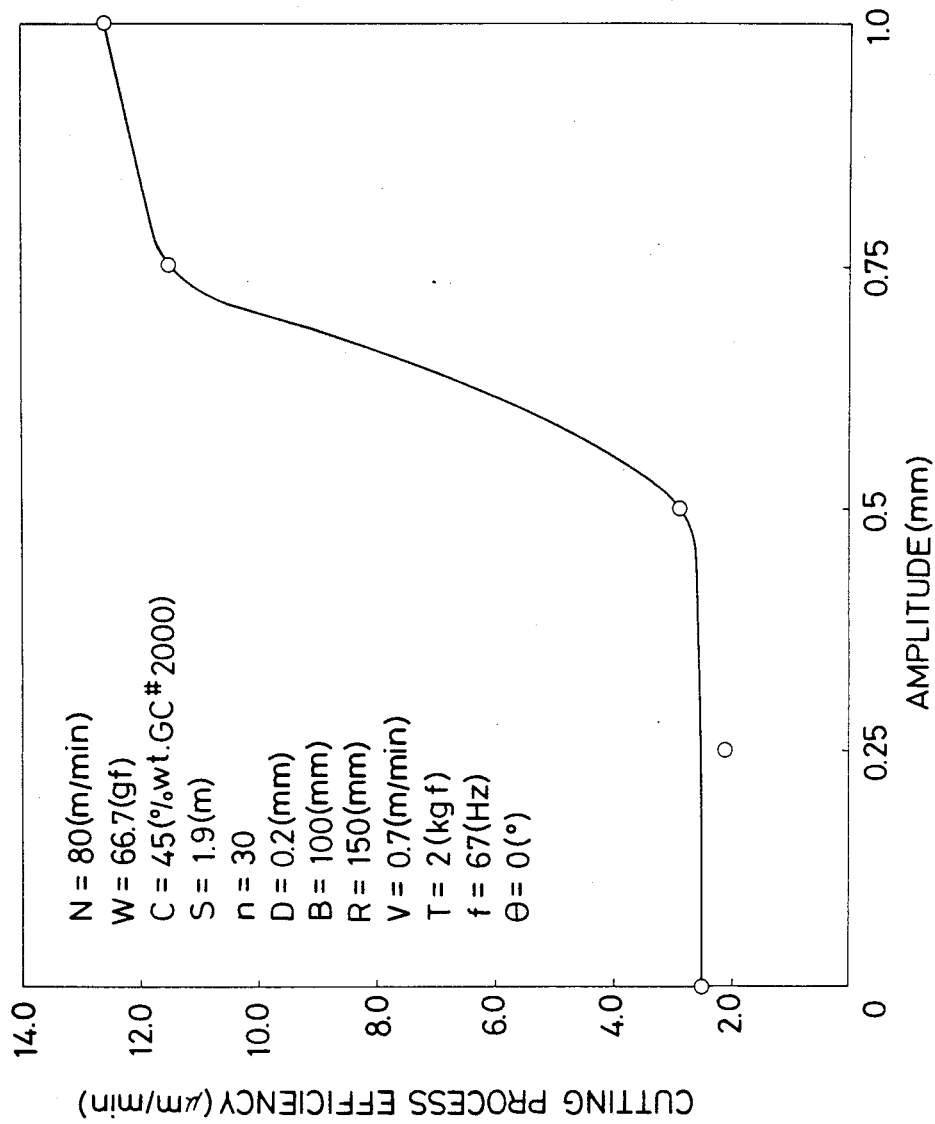
FIG. 7 is a graph showing the characteristic of variations in the cutting efficiency in relation to the amplitude of the vibration.

The foregoing statement has been proven to be true through experiments. FIG. 7 shows the results of these experiments, which were conducted with the apparatus of FIG. 1 under the following conditions: A glass material was employed as the object to be processed. The pushing force applied as a load on the wire lines was 40 to 70 g per wire line to bring about wire deflection to a degree Δ of about 0.5 mm. The machining efficiency which was a cutting amount per minute, was measured with varied values of amplitude of a low frequency vibration applied to the wire W. As apparent from FIG. 7, the machining efficiency does not increase with the amplitude of vibration which does not exceed the deflection degree δ (=0.5 mm). Whereas, it greately increases with the amplitude exceeding the deflection degree.

The details of the conditions of the experiments are as follows:

| | | |
|---|---|---|
| Travelling speed of the wire | N | 80 m/min |
| Process load on the wire | W | 66.7 gf/wire line |
| Concentration of the process liquid | C | 45% wt. GC#2000 |
| Wire stroke | S | 1.9 m |
| Number of wire lines | n | 30 |
| Wire diameter | D | 0.2 mm |
| Width of the object | B | 100 mm |
| Distance between multi-grooved blocks | R | 150 mm |
| New wire feeding speed | V | 0.7 m/min. |
| Wire tension | T | 2 kgf |
| Number of vibration | f | 67 Hz |
| Phase of left and right pairs of multi-grooved blocks | θ | 0° |

The results of the experiments shown in FIG. 7 where obtained with two units of vibrators 112₁ and 112₂ of FIG. 1 operated to give inphase vibrations of the same frequency (67 Hz). This arrangement may be changed to vibrate the wrie W in a wave-like manner by differentiating the phase of the above-stated vibrations.

Further, since the vibration is to be applied to vibrate the wire W and the object relative to each other, it may be imparted ot the process stand.

In accordance with the arrangement of the multi-wire type vibratory cutting method of this invention as described in detail in the foregoing, the low frequency vibration is imparted either to the wire travelling across the cutting process part or to the object to be processed. The vibration is arranged to have an amplitude larger than the degree of deflection of the wire which takes place with the wire in a pressed contact with the object. In cutting the object, this arrangement greatly enhances the cutting work efficiency. Further, the invented multi-wire vibratory cutting apparatus has a great advantage in that: The wire portion reciprocating at the cutting process part is gradually replaced with a new wire portion and is moved away from that part before it reaches an allowable wear limit to prevent wire breakage, so that the productivity of the apparatus becomes much higher than the conventional multi-wire saw of this kind. This advantage is salient particularly when the apparatus is applied to a cutting operation on such a material as G.G.G.

In the case of the apparatus of FIG. 1, the use of two vibrators facilitates adjustment of the amplitude. However, it necessitates use of an increased number of related components including: Oscillators, amplifier, a phase difference measuring instrument for adjusting the phase of one vibrator to that of the other, a strain amplifier for detecting a phase difference and amplitude, a synchroscope, etc. Besides, the wiring of the apparatus becomes complex, and therefore the cost of the apparatus as a whole increases. It is another disdvantage of the apparatus that the vibration of the wire is affected directly by the precision of the bearing through which the vibration produced by the vibrators is transmitted to the wire.

Whereas, in the eccentric multi-grooved block type multi-wire vibratory cutting apparatus which is shown in FIG. 4, the low frequency vibration to be imparted to the wire portion reciprocating at the cutting part is obtained, without recourse to any vibrator, from the rotation of four eccentric multi-grooved blocks having the same phase, the same degree of eccentricity and the same size. These eccentric blocks are synchronously rotated by the wire travel driving motor with their rotating direction periodically reversed. Such being the arrangement, the apparatus of FIG. 4 solves the above-stated problem of the apparatus of FIG. 1 and yet is capable of giving the same advantageous vibratory cutting effect as the latter. Therefore, the apparatus gives a much higher productivity than the conventional multi-wire saw of this kind. This advantage is particularly salient when the apparatus is applied to a cutting operation on such a material as G.G.G.

What is claimed is:

1. A multi-wire type cutting method of stretching and lapping a continuous wire many times around four multi-grooved blocks disposed at the vartexes of a rectangle, bringing the lower horizontal parallel stretching lines of the wire into a pressed contact with an object which is to be processed and is made of a hard and brittle material, and reciprocating the contact parts of the wire lines while applying an abrasive grain suspension to the contact parts and thus carrying out cutting work on the object, comprising the steps of: feeding an unused portion of the wire gradually to the contact parts while gradually moving a used portion of said wire away from the contact parts during the periodic reciprocating motion of the wire lines; applying a low frequency vibration in the cutting direction either to the wire lines or to the object at the contact parts with the amplitude of said vibration arranged to be greater than the degree of deflection of the wire lines which takes place when said wire lines are pressed into contact with said object.

2. A mutli-wire type cutting method according to claim 1, wherein said low frequency vibration is arranged to be imparted to said multi-grooved blocks around which said wire is stretched and lapped.

3. A multi-wire type cutting method according to claim 2, wherein said multi-grooved blocks in the upper and lower positions are paired on two opposite sides of said object; each of the two pairs of said upper and lower blocks are arranged to receive vertical low frequency vibrations separately and independently of the other pair; and said low frequency vibrations are imparted to said two block pairs either in synchrony with each other or with their phase differentiated from each other.

4. A vibrating multi-wire type cutting apparatus arranged to have many lines of a continuous fine wire wound many times around four multi-grooved blocks disposed at the vertexes of a rectangle, to bring the lower horizontal parallel stretched portions of said wire lines into a pressed contact with an object which is to be processed and is made of a hard and brittle material and to cause the wire lines to travel while applying an abrasive grain suspension to the contact parts for cutting said object, comprising wire pay-out and take-up means for gradually feeding a new portion of said wire to the parts of said wire lines which are in contact with the object and for gradually moving a used portion of said wire away from said contact parts; wire travel control means for causing said wire lines to periodically reciprocate at said contact parts; fixed supporting blocks each of which is arranged to carry a pair of upper and lower multi-grooved blocks through an elastic plate on each of two sides of said object; and vibrators which are arranged to impart a low frequency vertical vibration to each of the pairs of said multi-grooved blocks with the amplitude of said vibration arranged to exceed the degree of deflection of said wire lines which takes place when the wire lines are in a pressed contact with said object.

5. A vibrating multi-wire type cutting apparatus according to claim 4, wherein said wire pay-out and take-up means includes a new wire bobbin and a take-up bobbin which are arranged to be driven by motors respectively.

6. A vibrating multi-wire type cutting apparatus according to claim 4, wherein said wire travel control means includes first and second standing block groups which are spaced in the upper and lower positions; a slides which is arranged to make a reciprocating motion between said first and second standing block groups; first and second running block groups which are attached to said slider; a balancing weight which is arranged to balance with the weight of said slider and said two running block groups; and a pair of limit switches which are arranged at two ends of the stroke of the reciprocating stroke of said slider to effect a switch-over between one rotating direction of a wire travel driving motor and another rotating direction thereof by engaging said slider.

7. An eccentric multi-grooved block type multi-wire vibratory cutting apparatus comprising a cutting process part arranged to have a continuous fine wire lapped many times around four multi-grooved blocks having eccentric shafts, to bring lower horizontal portions of the parallel stretched lines of said wire into a pressed contact with an object which is to be processed and is made of a hard and brittle material and to reciprocate said wire lines while supplying an abrasive grain suspension to their parts contacting said object for cutting said object; a wire pay-out and take-up part arranged to pay out and supply a new portion of said wire to said cutting process part and to take up a used portion of said wire from said cutting process part; a wire travel control part arranged to control the reciprocating motion of said wire at said cutting process part; and a wire tension variation modifying part arranged to modify variations in the tension of a portion of said wire stretched between said wire travel control part and said cutting process part, said apparatus being characterized in that, with the eccentricity of said eccentric multi-grooved blocks assumed to $\epsilon$ and with the degree of deflection which takes place when said wire lines are in a pressed contact with said object to be $\delta$, the appratus is arranged to have a relation of $\epsilon > \delta$.

8. An eccentric multi-grooved block type multi-wire vibratory cutting apparatus according to claim 7, wherein said wire pay-out and take-up part includes a new wire bobbin and a take-up bobbin which are respectively arranged to be driven by motors.

9. An apparatus according to claim 7, wherein said wire travel control part includes first and second standing block groups which are spaced in the upper and lower positions; a slider which is arranged to make a reciptocating motion between said first and second standing block groups which are attached to said slider; a balancing weight which is arranged to balance with the weight of said slider and said two running block groups; and a pair of limit switches which are arranged at two ends of the reciprocating stroke of said slider to reverse the rotating direction of a wire travel driving motor by engaging said slider.

10. An apparatus according to claim 7, wherein said wire tension variation modifying part includes first and second eccentric shaft parts which are arranged above the middle part of the upper horizontal portions of said wire lines to have the same phase and the same degree of eccentricity as those of said eccentric multi-grooved blocks, said eccentric shaft parts being provided with first and second freely rotatable blocks; and a portion of said fine wire between said wire travel control part and said cutting process part is lapped onto said first and second freely rotatable blocks.

* * * * *